United States Patent
Kleinknecht et al.

(10) Patent No.: US 12,334,853 B2
(45) Date of Patent: Jun. 17, 2025

(54) METHOD AND APPARATUS FOR CONTROLLING AN INVERTER

(71) Applicant: Robert Bosch GmbH, Stuttgart (DE)

(72) Inventors: Marco Kleinknecht, Bietigheim-Bissingen (DE); Thomas Zeltwanger, Ingersheim (DE)

(73) Assignee: Robert Bosch GmbH, Stuttgart (DE)

( * ) Notice: Subject to any disclaimer, the term of this patent is extended or adjusted under 35 U.S.C. 154(b) by 221 days.

(21) Appl. No.: 18/257,381

(22) PCT Filed: Dec. 2, 2021

(86) PCT No.: PCT/EP2021/083970
§ 371 (c)(1),
(2) Date: Jun. 14, 2023

(87) PCT Pub. No.: WO2022/128508
PCT Pub. Date: Jun. 23, 2022

(65) Prior Publication Data
US 2024/0022198 A1  Jan. 18, 2024

(30) Foreign Application Priority Data
Dec. 15, 2020 (DE) .................. 10 2020 215 893.2

(51) Int. Cl.
*H02P 27/08* (2006.01)
*H02P 21/16* (2016.01)
*H02P 21/22* (2016.01)

(52) U.S. Cl.
CPC ............ *H02P 27/085* (2013.01); *H02P 21/16* (2016.02); *H02P 21/22* (2016.02); *H02P 2207/05* (2013.01)

(58) Field of Classification Search
CPC ........ H02P 27/085; H02P 21/16; H02P 21/22; H02P 2207/05
(Continued)

(56) References Cited

U.S. PATENT DOCUMENTS 11,165,381 B2 *  11/2021  Jian ..................... H02P 21/16
2010/0308892 A1 *  12/2010  Sakakibara ......... H02M 5/4585
327/482

FOREIGN PATENT DOCUMENTS

CN  102223138 B  4/2013
CN  105656337 B  12/2018
(Continued)

OTHER PUBLICATIONS

Liu et al. (CN 102223138 A)Motor Synchronous Modulation Method and Control System Thereof (Year: 2011).*
(Continued)

*Primary Examiner* — Jorge L Carrasquillo
(74) *Attorney, Agent, or Firm* — Michael Best & Friedrich LLP

(57) ABSTRACT

The invention relates to a method (100) for controlling an inverter (260), wherein the inverter (260) converts a DC voltage into a multi-phase AC voltage in order to power an electric machine (270). The method comprises the following steps: determining (120) an electrical frequency (f_el) of the electric machine (270); determining (130) a target_switching frequency (f_p_s) for a pulse-width modulation, wherein the target_switching frequency (f_p_s) is synchronous with the determined electrical frequency (f_el) of the electric machine; specifying (140) a target_start angle (alpha_s) of a first voltage indicator of the pulse-width modulation in relation to the stator-fixed alpha axis, or to one of the basic voltage indicators; controlling (150) the inverter (260) by means of pulse-width modulation using the determined target_switching frequency (f_p_s) and the specified target_start angle (alpha_s).

10 Claims, 4 Drawing Sheets

(58) Field of Classification Search
USPC .......................................... 318/400.3, 568.19
See application file for complete search history.

(56) References Cited

FOREIGN PATENT DOCUMENTS

DE   102011081216 A1   2/2013
DE   102016211858 A1   1/2018

OTHER PUBLICATIONS

Shi et al. (CN 105656337 A)A High-power Three-level Rectifier Point Voltage Balance Control Method (Year: 2016).*
Hu (DE 102011081216 A1) Three-phase Machine Driving Method and Device (Year: 2013).*
Zhang (CN 111756299 A) Method for Detecting Motor Speed and Direction and Related Device (Year: 2020).*
Translation of International Search Report for Application No. PCT/EP2021/083970 dated Mar. 14, 2022 (3 pages).
Xiao et al., "Strategy and Implementation of Harmonic-Reduced Synchronized SVPWM for High-Power Traction Machine Drives," IEEE Transactions on Power Electronics, 2020, vol. 35, No. 11, 14 pages.

* cited by examiner

METHOD AND APPARATUS FOR CONTROLLING AN INVERTER

BACKGROUND

The invention relates to a method and apparatus for controlling an inverter. The invention further relates to a powertrain having a corresponding apparatus and a vehicle having a powertrain, as well as a computer program and a machine-readable memory medium.

A method for controlling a three-phase electric machine is known from DE 10 2011 081 216, the three-phase electric machine being powered in a multiple phase manner by means of an inverter. The inverter is controlled within a first rotational speed range of the three-phase machine in a first control mode and within a second rotational speed range in a second control mode. Operation at various rotational speed ranges is advantageously achieved as a result. There is a need to further improve such methods and/or provide alternative methods for further reducing losses during the operation of electric machines.

SUMMARY

A method for controlling an inverter is provided. The inverter converts a DC voltage into a multi-phase AC voltage in order to power an electric machine. The method comprises the following steps: determining an electrical frequency of the electric machine; determining a target_switching frequency for a pulse-width modulation, the target_switching frequency being synchronous with the electrical frequency of the electric machine;
    specifying a target_start angle of a first voltage indicator of the pulse-width modulation in relation to the stator-fixed alpha axis, or to one of the basic voltage indicators; controlling the inverter by means of pulse-width modulation using the determined target_switching frequency (f_p_s) and the specified target_start angle (alpha_s).

A method for controlling an inverter is provided. The inverter converts a DC voltage into a multi-phase AC voltage in order to power an electric machine. Pulse-width modulation is used for this purpose. In pulse-width modulation (PWM), switching elements of the inverter having different duty cycles are preferably actuated at a switching frequency which is preferably constant. Each switching element is switched on and off (no more than) once per PWM period. The switching frequency corresponds to the reciprocal value of the periodic duration of the pulse-width modulation. Such a PWM method is also referred to as a carrier frequency method. In carrier frequency methods, the switching pattern is based on a fixed switching grid or computational grid, i.e., the carrier frequency. Given actuation of the switching elements, an input DC voltage is converted into a multi-phase output voltage with a variable amplitude, phase, and electrical frequency. The electrical frequency is proportional to the rotational speed of the electric machine. The switching frequency is much greater than the electrical frequency, so a sinusoidal alternating voltage can be generated at the electrical frequency by controlling the switching elements. If pulse-width modulation at a fixed switching frequency is used, the ratio of the electrical frequency to the switching frequency is not constant because the rotational speed of the electric machine in a passenger car is constantly changing. The two frequencies are therefore asynchronous in relation to each other. The switching frequency is often changed at the running time, e.g., in order to reduce switching losses, but it is not necessarily tracked according to the electric rotational speed, so synchronicity is still lacking. Therefore, the method comprises the following steps: determining an electrical frequency of the electric machine; determining a target_switching frequency for a pulse-width modulation. The target_switching frequency is in this case intended to be synchronous with the electrical frequency of the electric machine. In other words, the ratio or quotient of the switching frequency to the electrical frequency is constant and preferably an integer. In such an angle-synchronous method, the switching elements are preferably switched on and off once or more per electrical period as a function of the electrical angle. In angle-synchronous methods, the switching pattern is fixedly oriented to the electrical period or the angle thereof. When using angle-synchronous switching, these methods are only suitable starting from a certain electrical frequency. They have their advantages, especially at high electrical frequencies. The voltage yield is at its maximum using the block operation variant (also referred to as block clocking, block commutation, basic frequency clocking, or the six-step mode). Subharmonic frequencies are avoided by means of synchronicity, and the switching frequency is reduced. Accordingly, system advantages such as high efficiencies of the power module and the electric machine (and therefore the entire electrical drive) are established. A maximum phase current is enabled. The acoustics, EMV, and voltage ripple (and thereby also mechanical loads) are kept to a minimum. Other angle-synchronous methods, e.g. triple mid-pulse clocking, have the property of variably changing not only the angle position, but also the resulting voltage indicator length by means of additional synchronous switching operations.

Also specified is a target_start angle of a first voltage indicator of the pulse-width modulation in relation to the stator-fixed alpha axis, or to one of the basic voltage indicators, in a stator-fixed alpha/beta coordinate system. Pulse-width modulation uses a stator-fixed alpha/beta coordinate system to represent the space vectors of the voltage curve, i.e., the voltage indicator. The alpha axis indicates the direction of a first phase voltage in the stator-fixed alpha/beta coordinate system. By defining a target_start angle of a first voltage indicator of the pulse-width modulation in relation to the stator-fixed alpha axis, or to one of the basic voltage indicators, the largest possible adjustable voltage indicator length (and therefore the largest adjustable possible voltage amplitude that can be provided by means of pulse-width modulation at a constant input voltage) is specified. The method furthermore comprises the step of controlling the inverter by means of pulse-width modulation using the determined target_switching frequency and the specified target_start angle.

Advantageously provided is a method for providing pulse-width modulation that, given its synchronicity with the electrical frequency (among other things), enables an even torque output of the electric machine and enables a variable maximum adjustable voltage to be set given the specification of the start angle. These properties are advantageously usable in the area(s) of overmodulation and/or for transitioning from pulse-width modulation to block operation, or vice versa (and in block operation in order to improve controllability and provide system advantages). The battery voltage is advantageously utilized more efficiently because a longer voltage indicator is adjustable, so more voltage becomes available, resulting in a lower current and reduced losses thereby. The synchronicity of the PWM methods is advantageously utilized for a smooth transition to block operation and simultaneously for control purposes. The voltage indicator is preferably adjusted during block operation, i.e. lengthened or shortened, as a function of target value changes and interferences. Preferably, the cost of implementation and maintenance is lower than in enhanced methods of synchronous clocking. Preferably, other PWM modulation methods such as SVPWM or flat-top can also be optimized by only tracking the switching frequency at a suitable constant ratio. High-loss (stability) effects during overmodulation (or even at lower modulations) are thus avoided. At the same time, higher overmodulation is enabled at equal or even lower losses. The advantages of synchronicity are even useful at a lower electrical frequency. Given a utility at frequencies lower than usual for block operation, higher availability is provided for operating points using synchronous methods. Preferably, the ratio of electrical frequency to the target_switching frequency and the target_start_angle is adjusted by a controller, a regulator, or a mixed method (pilot control and regulation).

In another embodiment of the invention, when determining the synchronous target_switching frequency for the pulse-width modulation to the electrical frequency of the electric machine, the electrical frequency is multiplied by a specifiable integer switching number.

To determine the target_switching frequency, which is intended to be synchronous with the electrical frequency of the electric machine, the electrical frequency is multiplied by a specifiable integer switching number. In three-phase electrical drive systems, the specifiable switching number is preferably 6 and multiples thereof (6, 12, 18, 24, etc.).

Advantageously, a method for determining a synchronous target_switching frequency for the pulse-width modulation to the electrical frequency is provided. Given the topology of the inverter, e.g., 3-phase with a B6 bridge, not all switching numbers are suitable for overmodulation. In the case of unsuitable switching numbers, e.g., 7 in a 3-phase system, the voltage indicators in overmodulation are shortened to varying extents, resulting in baseband signals and subharmonic vibrations in the phase voltages. On the one hand, these lead to significant losses, loss of comfort (torque fluctuations), signal vibrations (difficult actual value acquisition), poorer control accuracy and, on the other hand, to the fact that overmodulation can only be exploited to a limited extent and cannot be used as a method for transitioning between PWM methods and block operation. These disadvantages increase as the switching number decreases. An asynchronous PWM method, in which the switching number continuously changes, also necessarily passes through inappropriate switching conditions. As a result, the maximum possible overmodulation is often globally limited, although this problem only occurs at individual switching numbers. Preferably, the additional potential of overmodulation is utilized by means of synchronization and suitable switching numbers (e.g., 6, 8, 9, 10, 12, 14, 15, 16, 18, 21, etc.), at which these phenomena do not in principle occur. It is often preferable to reduce the switching frequency in order to reduce the resulting losses in individual components. A lower switching frequency means that, even at low to medium rotational speeds, low switching numbers (q<20) are already obtained. These in turn negatively impact other components given the aforementioned disadvantages of passing through unsuitable switching numbers. Preferably, synchronization prevents these drawbacks from occurring, thus enabling a more loss-free and/or further reduction of the switching frequency.

Since the voltage is at its maximum during field weakening, increasing the maximum possible voltage by more overmodulation preferably results in lower currents, thereby reducing losses and increasing efficiency.

When used for the transition to block operation, certain switching numbers preferably provide the possibility of a smooth transition. The pulse shape with decreasingly smaller zero indicators (pulses) or greater modulation increasingly corresponds to the current profile in block operation. Block operation is advantageous given, among other things, a sufficiently high electrical frequency and/or a sufficient minimum target voltage indicator length/modulation index (i.e., near or in field weakening). If the necessary criteria are present, then the transition to block operation is preferably activated. If these criteria are no longer present, then a transition from block operation to the PWM method is activated. Therefore, the transition describes both directions. Suitable switching numbers are preferably provided to obtain a transition that is as continuous as possible (e.g., 6, 8, 9, 10, 12, 14, 15, 16, 18, 21, etc.). The voltage indicator length or modulation index can then be flexibly adjusted. When transitioning to block operation, a switching number is preferably set to have a maximum voltage indicator length limit that corresponds to the maximum voltage indicator length limit of the previous switching number. Over time, or depending on a different or further system state, the maximum adjustable voltage indicator length is preferably altered until it reaches that of block operation. For this purpose, the voltage pulses are preferably reduced to the minimum pulse-width until the switching pattern corresponds exactly to that of block operation. The pulses are in this case preferably not switched at all when the minimum pulse-width is not achieved. Once the maximum voltage indicator length limit corresponds to the limit of block operation, the transition is terminated, and a switch is preferably made to block operation. The process from block operation to pulse-width modulation is preferably performed in a correspondingly inverse manner. If the decision against the target modulation method (PWM method or block operation) changes during the transition, the transition is preferably reversed again. Switching to block operation preferably takes place at the maximum modulation of the synchronous SVPWM method. If the controller must reduce its voltage indicator length during the switching operation due to a fault or a target value change, this must preferably still be possible in order to avoid restricting control behavior. Preferably, this shortening can also be performed using a synchronized SVPWM method.

In another embodiment of the invention, the target_start angle of a first voltage indicator is specified in relation to the stator-fixed alpha axis, or to one of the basic voltage indicators, as a function of operating point specifications, and is in particular 0° or 30°.

The target_start angle is specified as a function of operating point specifications. It is evident from the stator-fixed alpha-/beta coordinate system that different maximum voltages can be provided with pulse-width modulation as a function of the target start angle selection. Depending on current operating point specifications, e.g., when increasing the rotational speed of the electric machine, which necessitates a transition from pulse-width modulation to block commutation, target_start angles that make it possible to set a respectively necessary maximum voltage are selected. Target_start angles for minimum adjustable voltages result in three-phase electrical drive systems at 360°/(2*q). For use in three-phase systems and q=6, a start angle is therefore preferably 30°. As can, e.g., be gathered from FIG. 2, comparable effects are preferably obtained at q=6, corresponding to start angles of 90°, 150°, 210°, or 270°, i.e., at a distance of 360°/q from the determined start angle. Target_start angles for maximum adjustable voltages result in electrical drive systems independently of the number of phases at target_start angles of 0° in relation to the stator-fixed alpha axis or to one of the basic voltage indicators. Comparable effects at q=6 (as shown hereinabove) preferably result for start angles at a distance of 360°/q with start angles of 60°, 120°, 180°, or 240°.

A method for specifying a target_start angle of a first voltage indicator for pulse-width modulation is advantageously provided.

In another embodiment of the invention, the method for controlling the electric machine is performed if the amount of the determined electrical frequency of the electric machine is greater than a first specifiable limit and/or less than a second specifiable limit.

If the amount of the determined electrical frequency of the electric machine is greater than a first specifiable limit and/or less than a second specifiable limit, the electric machine is within a rotational speed range within which synchronous pulse-width modulation is possible, i.e., pulse-width modulation whose switching frequency is synchronous with the electrical frequency of the electric machine. This is possible because the electrical frequency is significantly greater than zero. Moreover, the electric machine is within a rotational speed range within which the pulse-width modulation can still be performed, since the rotational speed is not yet too close to the switching frequency.

Advantageously, a method is provided that enables effective use of synchronous pulse-width modulation.

In another embodiment of the invention, the method for controlling an inverter at the operating point of the overmodulation is performed.

Advantageously, a method for controlling an inverter when operating the overmodulation is provided. Advantageously, this method minimizes torque oscillation at the operating point of overmodulation and minimizes torque jump during the transition from pulse-width modulation to block commutation by maximizing the adjustable voltage using an approximation to the transition from pulse-width modulation to block commutation.

In another embodiment of the invention, a pulse-width modulated space vector modulation is performed at a specifiable switching frequency in order to control an inverter if the amount of the determined electrical frequency of the electric machine is less than the first specifiable limit, whereby the specifiable switching frequency is in particular at least partially asynchronous with the electrical frequency.

If the amount of the determined electrical frequency of the electric machine is less than the first specifiable limit, then the method provides for controlling the inverter at a specifiable switching frequency by means of pulse-width modulation. The electric machine is in this case preferably in a very low rotational speed range of the electric machine, within which synchronous pulse-width modulation is not possible. As a result, the inverter is controlled using asynchronous pulse-width modulation within this rotational speed range.

Advantageously, a method for controlling an inverter at low rotational speeds is provided.

In another embodiment of the invention, a modulation synchronous with the electrical frequency, in particular a block commutation, is performed in order to control an inverter if the amount of the determined electrical frequency of the electric machine is greater than the second specifiable limit.

If the amount of the determined electrical frequency of the electric machine is greater than the second specifiable limit, the method provides for controlling the inverter by way of a modulation that is synchronous with the electrical frequency, in particular a block commutation. The electric machine is in this case preferably in a very high rotational speed range of the electric machine, within which pulse-width modulation is no longer optimal or possible, since the electrical frequency is too close to the switching frequency. As a result, the inverter is controlled using synchronous pulse-width modulation within this rotational speed range.

Advantageously, a method for controlling an inverter at high rotational speeds is provided.

The invention further relates to a computer program comprising commands which, when the program is executed by a computer, prompt the latter to perform the method steps according to the invention.

The invention furthermore relates to a machine-readable memory medium comprising commands which, when executed by a computer, prompt the latter to perform the method steps described hereinabove.

The invention further relates to an apparatus for controlling an inverter, the apparatus comprising a current control loop with voltage modulation, characterized in that the apparatus comprises a first control or regulation loop for determining and defining the target_switching frequency in a manner synchronous with the electrical frequency, said apparatus being configured to perform a method according to the disclosure.

An apparatus for controlling an inverter is provided. Said apparatus comprises a current control loop with voltage modulation. A current control loop is used to control current through an electric machine. Voltage modulation is used to convert the conversion of the DC input voltage into an AC output voltage of the inverter, which ultimately forms the current through the electric machine in a connected electric machine. The apparatus further comprises a control or regulation loop. The latter is used to determine and specify the target_switching frequency synchronously with the electrical frequency. The apparatus is further configured to perform the method described thus far.

Advantageously, an apparatus is provided which performs pulse-width modulation and which enables a uniform torque output of the electric machine given its synchronicity with the electrical frequency, among other things, and enables a variable maximum adjustable voltage to be set due to the specification of the start angle.

The invention further relates to a powertrain having an apparatus for controlling an inverter and in particular having power electronics and/or an electrical drive. Such a powertrain is used, e.g., to drive an electrical vehicle. By means of the method and the apparatus, efficient operation of the powertrain is enabled.

The invention further relates to a vehicle having a powertrain as described. Advantageously, a vehicle comprising an apparatus for controlling an inverter is thus provided.

It is understood that the features, properties, and advantages of the method according to the invention apply or can be correspondingly applied to the apparatus, or to the powertrain and vehicle, and vice versa.

The method and apparatus can preferably also be used for further drive solutions, machines, and inverters having different phase numbers. The limit of the maximum voltage indicator length is preferably continuous and can in this case feature any desired profile, preferably uniform. Preferably, a different angle-synchronous modulation method is controlled instead of block operation.

Further features and advantages of embodiments of the invention follow from the subsequent description with reference to the accompanying drawings.

BRIEF DESCRIPTION OF THE DRAWINGS

The invention will be explained in more detail hereinafter with reference to the drawings.

DETAILED DESCRIPTION

Figure 1:
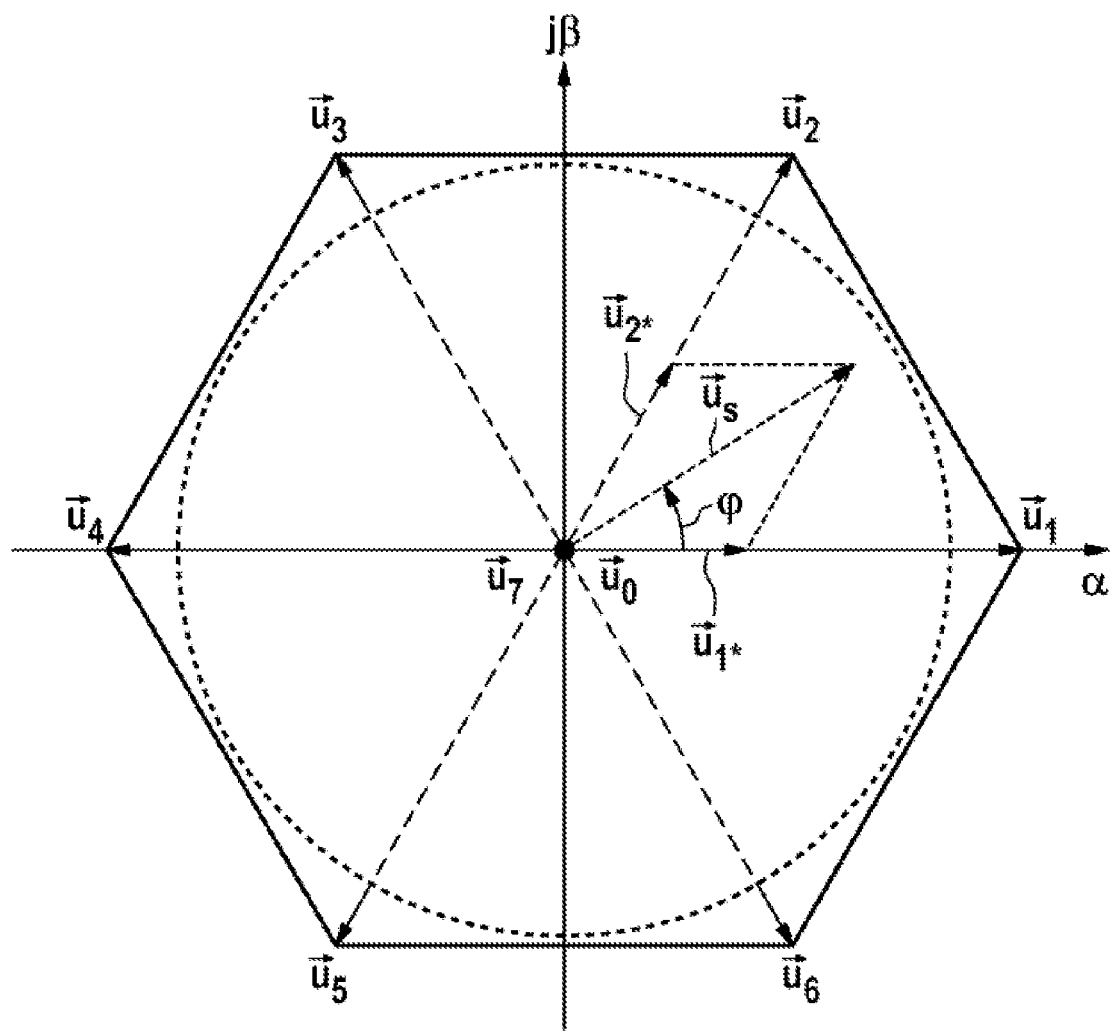
FIG. 1 shows, by way of example, an alpha/beta coordinate system with basic voltage indicators drawn

FIG. 1 shows, by way of example, an alpha/beta coordinate system with drawn basic voltage indicators u_0 to u_7 and an, e.g., adjustable voltage indicator u_s. This representation relates to a space vector modulation, also known as SVPWM (space vector pulse-width modulation). This illustration is exemplary of a three-phase system. An angle of 60° is thus obtained between the basic voltage indicators u_1 to u_6. Using this modulation, on a temporal average, each voltage indicator (e.g., u_s), a modulated (target) voltage indicator can be adjusted from its basic voltage indicator components within the hexagon. A sinusoidal signal, preferably for energizing an electric machine, can thereby be created, e.g., by successive voltage indicators on a circular track. The inner circle of the hexagon drawn represents the greatest possible adjustable sinusoidal phase voltage. If the circle is enlarged and limited wherever it would extend beyond the hexagon, then the voltage is over-modulated. The modulation is at the operating point of the overmodulation. No ideal sinus can be depicted in this area.

Figure 2:
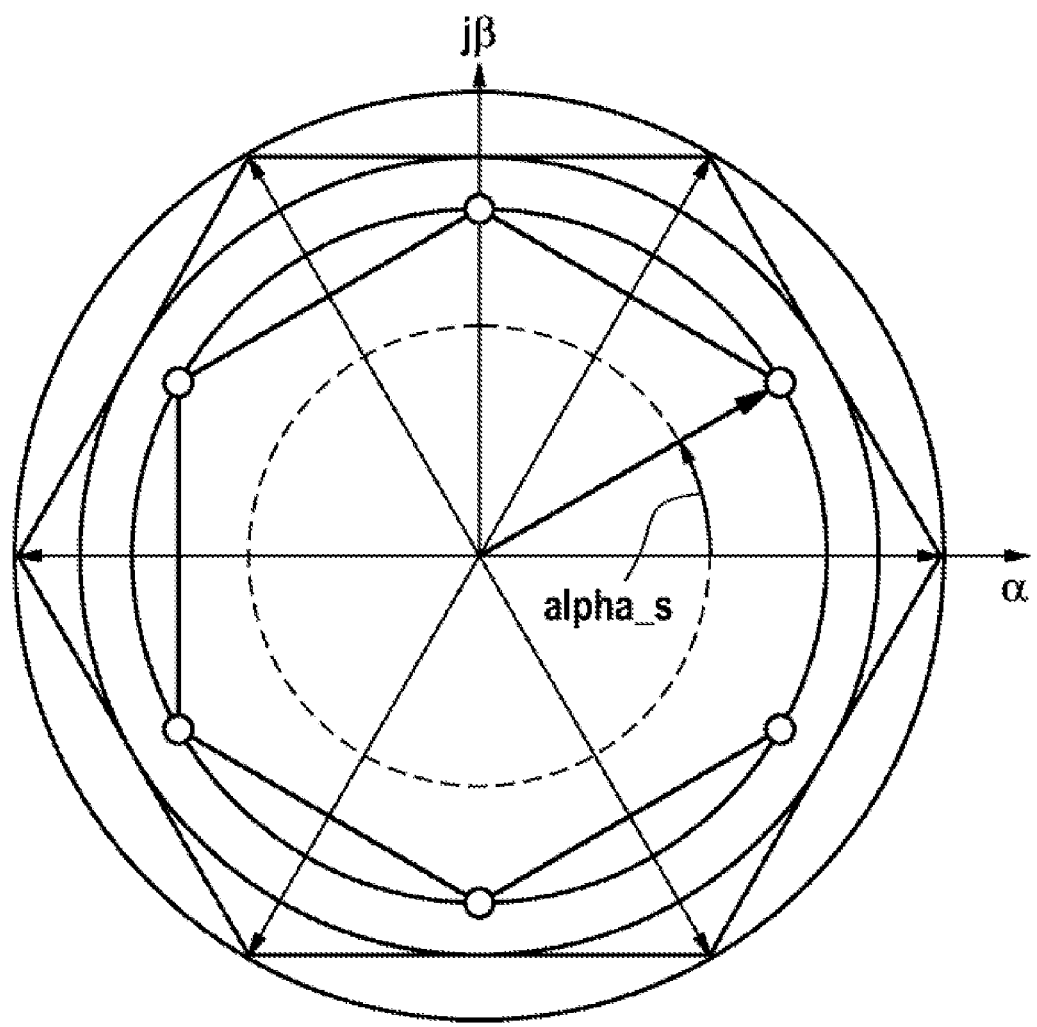
FIG. 2 shows, by way of example, an alpha/beta coordinate system with voltage indicators of a synchronized pulse-width modulation drawn FIG. 3 a schematic diagram of a controller for determining and defining a target_switching frequency FIG. 4 a schematic diagram of a regulation loop for controlling a start angle FIG. 5 a schematic diagram of a current control loop with an electric machine FIG. 6 a schematically illustrated vehicle having a powertrain, FIG. 7 a schematic flowchart for a method of controlling an inverter.

FIG. 2 shows, by way of example for a three-phase system, an alpha/beta coordinate system with six drawn voltage indicators (shown with the points) of a synchronized pulse-width modulation. The pulse-width modulation is synchronized because the switching frequency is selected to correspond to an integer multiple of the electrical frequency. By way of example, the switching number q=6 is shown as an integer multiple, so exactly six switching frequency periods are accommodated within an electrical period of 360°, each extending over 60° of the electrical period. Depending on which target_start angle alpha_s of a first voltage indicator of the pulse-width modulation is selected in relation to the stator-fixed alpha axis or to one of the basic voltage indicators, the result is a voltage that can be adjusted to a different maximum level, since it correlates with the maximum voltage indicator length within the hexagon. The switching number q=6 can be inferred from the diagram, which indicates how many voltage indicators are placed per electrical revolution or period. In addition, the start angle alpha_s is readable and indicates the angle of the first voltage indicator in relation to the alpha axis. Given the topology of the inverter (3-phase, B6 topology in this case), not all switching numbers are suitable for overmodulation. In case of unsuitable switching numbers, the voltage indicators in the overmodulation are shortened to varying extents, leading to baseband signals and subharmonic vibrations in the phase voltages. On the one hand, these lead to significant losses, loss of comfort (torque fluctuations), signal vibrations associated with difficult actual value acquisition, and poorer control accuracy. On the other hand, overmodulation can only be utilized to a limited extent, and cannot be used as a transition method between the pulse-width modulation method and block operation or block commutation. These disadvantages increase as the switching number decreases. An asynchronous PWM method, in which the switching number continuously changes, also necessarily passes through inappropriate switching conditions. Therefore, the maximum possible overmodulation is preferably often limited globally, although this problem occurs only in individual switching numbers.

Figure 3:
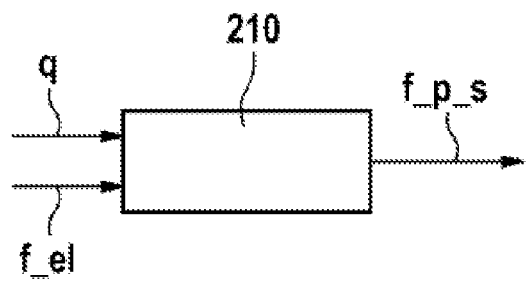

FIG. 3 shows a schematic diagram of a controller 210 used for determining and defining a target_switching frequency f_p_s. By means of the controller 210, the target_switching frequency f_p_s is determined and output as a product of the specifiable switching number q and the electrical frequency f_el.

Figure 4:
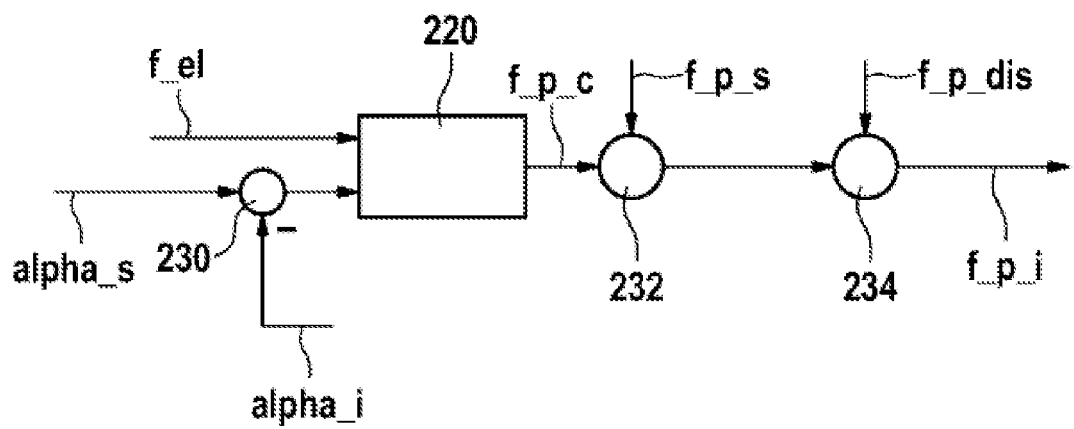

FIG. 4 shows a schematic diagram of a regulation loop for regulating a start angle. For this purpose, the regulation difference between the target_start angle alpha_s and the actual start angle alpha_i is supplied to a regulator 220. Depending on the regulation difference and the electrical frequency f_el, the regulator 220 determines an optimized switching frequency f_p_c. At a first node point 232, this is preferably merged with the target_switching frequency f_p_s, which can still be superimposed by interferences with the switching frequency f_p_dis in node 234, so that an actual_switching frequency f_p_i results, which is subsequently fed to a control path. This regulation path is preferably a current regulation for the electric machine.

Figure 5:
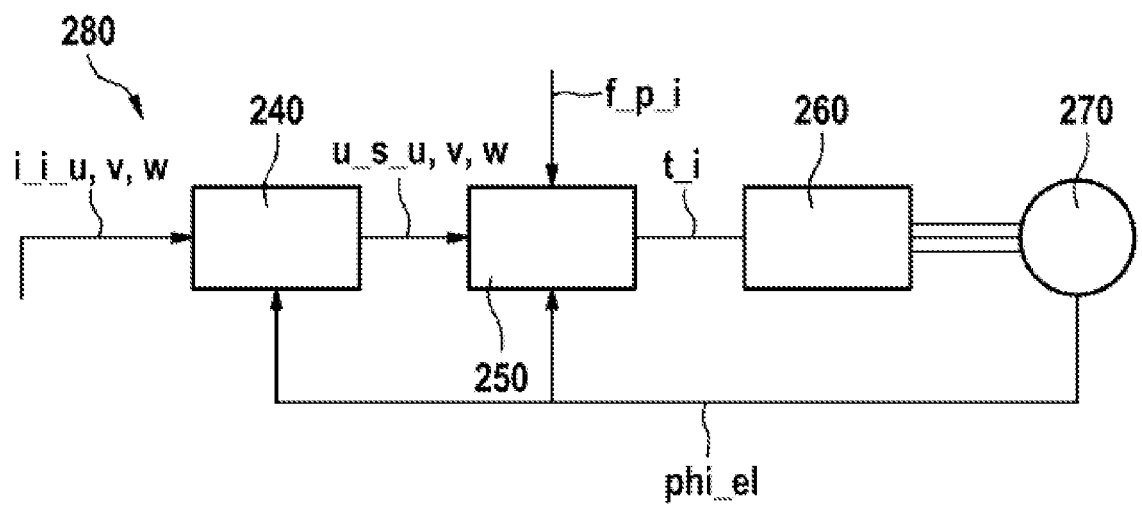

FIG. 5 shows a schematic representation of a current control loop 280 with an electric machine 270. The current control loop 280 preferably further comprises the current regulator 240, a voltage modulator 250, and an inverter 260. Depending on the regulation difference between the target_current and actual_current i_i_u,v,w as well as the electrical frequency f_el of the electric machine (or the corresponding rotational speed of the electric machine), the current regulator 240 determines a target_voltage u_s_u,v,w for the individual phases. Depending on the target_voltage u_s_u,v,w and the electrical frequency of the electric machine, the voltage modulator 250 preferably determines the switching times t_i for controlling the switching elements in the inverter 260 using the actual_switching frequency f_p_i. Given this control of the switching elements, corresponding voltage profiles result in the individual phases of the electric machine 270. Preferably, the setting of the switching number and the start angle can be implemented solely by influencing the actual_switching frequency f_p_i and using existing algorithms, such as SVPWM, Flattop, etc. For this purpose, the actual_switching frequency f_p_i is preferably specified in the existing current control loop 280, in which the voltage modulation 250 is also embedded, by means of an additional control or regulation loop 220 and/or the controller 210. The additional control or regulation loop 220 and/or the controller 210 calculates this actual_switching frequency f_p_i as a function of the current electrical frequency f_el and the switching number q as well as the controlled/regulated value, preferably the optimized switching frequency f_p_c or a correction fraction of the switching frequency, in order to obtain the desired angle position of the target_start angle alpha_s of the voltage indicators. The function for setting the switching number and the start angle is preferably either regulated or controlled, or it is a mixture of control and regulation, depending on requirements in stationary operation, as well as regarding target value changes.

Figure 6:
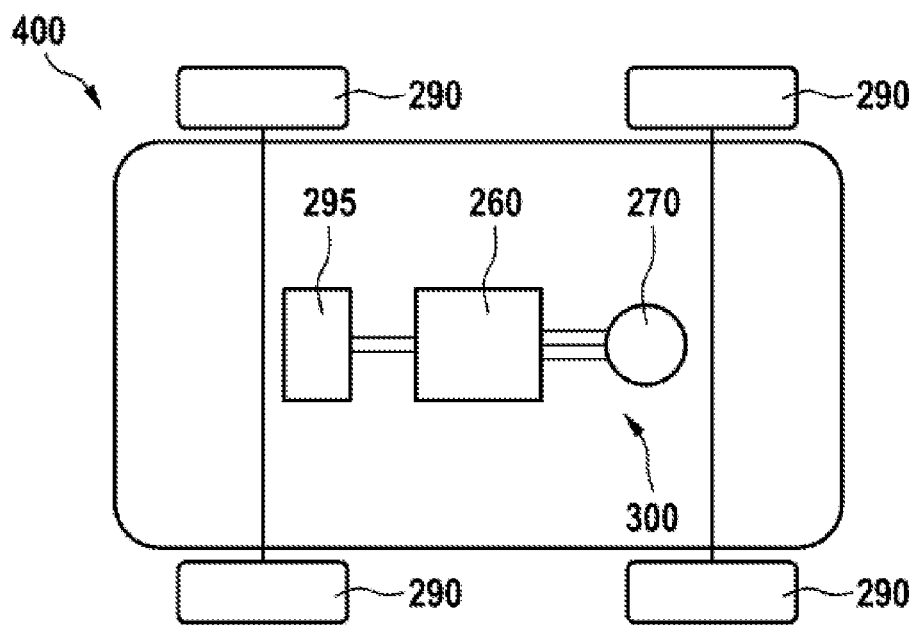

FIG. 6 shows a schematically illustrated vehicle 400 having a powertrain 300. The illustration shows the example of a vehicle 400 with four wheels 290, the invention being equally usable in any vehicle having any number of wheels on land, on water, and in the air. In particular, in addition to the apparatus 200 for controlling the inverter 260, the powertrain 300 further comprises a traction battery 295 for supplying electrical energy to the electrical powertrain 300, an inverter 260, and/or the electric machine 270.

Figure 7:
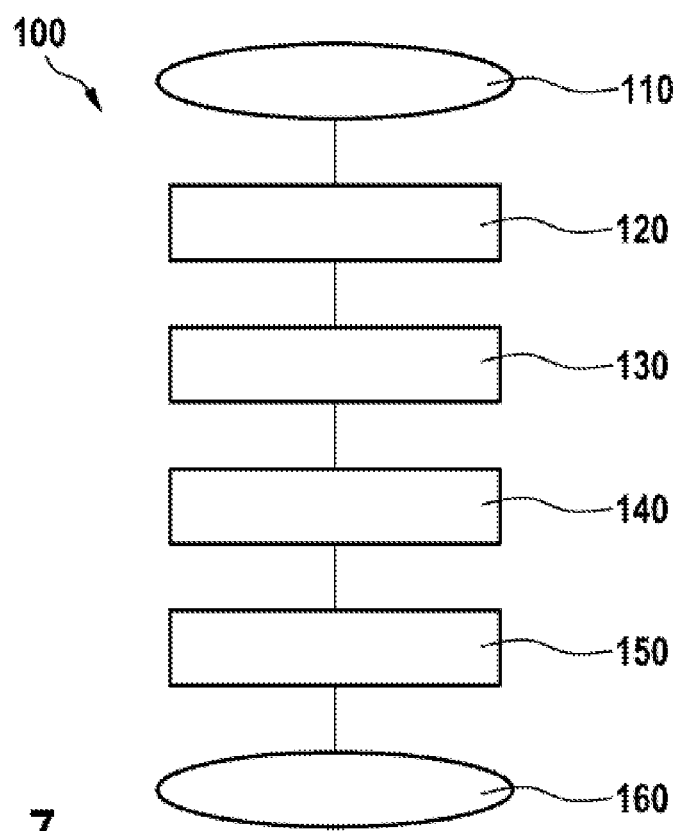

FIG. 7 shows a schematic sequence of a method 100 for controlling an inverter 260. The method starts with step 110. In step 120, an electrical frequency f_el of the electric machine 270 is determined. By way of step 130, a target_switching frequency f_p_s for a pulse-width modulation is determined, the target_switching frequency f_p_s being synchronous with the determined electrical frequency f_el of the electric machine. Provided in step 140 is a target_start angle alpha_s of a first voltage indicator of the pulse-width modulation in relation to the stator-fixed alpha axis, or to one of the basic voltage indicators. In step 150, the inverter 260 is operated by means of pulse-width modulation using the determined target_switching frequency f_p_s and the specified target_start angle alpha_s. The method ends at step 160.

The invention claimed is:

1. A method (100) for controlling an inverter (260), wherein the inverter (260) converts a DC voltage into a multi-phase AC voltage in order to power an electric machine (270), said method comprising the following steps:
   determining (120) an electrical frequency (f_el) of the electric machine (270);
   determining (130) a target_switching frequency (f_p_s) for a pulse-width modulation, wherein the target_switching frequency (f_p_s) is synchronous with the determined electrical frequency (f_el) of the electric machine;
   specifying (140) a target_start angle (alpha_s) of a first voltage indicator of the pulse-width modulation in relation to the stator-fixed alpha axis, or to one of the basic voltage indicators; and
   controlling (150) the inverter (260) by means of pulse-width modulation using the determined target_switching frequency (f_p_s) and the specified target_start angle (alpha_s), wherein, in order to control the inverter (260), a modulation synchronous with the electrical frequency, in particular a block commutation, is performed when the amount of the determined electrical frequency (f_el) of the electric machine (270) is greater than a second specifiable limit (f_2).

2. The method (100) according to claim 1, wherein, in order to determine the synchronous target_switching frequency (f_p_s) for the pulse-width modulation to the electrical frequency (f_el) of the electric machine (270), the electrical frequency (f_el) is multiplied by a specifiable integer switching number (q).

3. The method (100) according to claim 1, wherein the target_start angle (alpha_s) of a first voltage indicator is specified in relation to the stator-fixed alpha axis, or to one of the basic voltage indicators, as a function of operating point specifications, and in particular is 0° or 30°.

4. The method (100) according to claim 1, wherein the method (100) for controlling the electric machine (270) is performed when the amount of the determined electrical frequency (f_el) of the electric machine (270) is greater than a first specifiable limit (f_1) and/or less than the second specifiable limit (f_2).

5. The method according to claim 4, wherein the method (100) for controlling an inverter (260) is performed at the operating point of the overmodulation.

6. The method (100) according to claim 4, wherein, in order to control an inverter (260), a pulse-width modulated space vector modulation is performed at a specifiable switching frequency (f_v) if the amount of the determined electrical frequency (f_el) of the electric machine (270) is less than the first specifiable limit (f_1), wherein the specifiable switching frequency (f_v) is in particular at least partially asynchronous with the electrical frequency (f_el).

7. A non-transitory, computer-readable medium comprising commands which, when executed by a computer, cause the computer to control inverter (260), wherein the inverter (260) converts a DC voltage into a multi-phase AC voltage to power an electric machine (270), by:
   determining (120) an electrical frequency (f_el) of the electric machine (270);
   determining (130) a target_switching frequency (f_p_s) for a pulse-width modulation, wherein the target_switching frequency (f_p_s) is synchronous with the determined electrical frequency (f_el) of the electric machine;
   specifying (140) a target_start angle (alpha_s) of a first voltage indicator of the pulse-width modulation in relation to the stator-fixed alpha axis, or to one of the basic voltage indicators; and
   controlling (150) the inverter (260) by means of pulse-width modulation using the determined target_switching frequency (f_p_s) and the specified target_start angle (alpha_s), wherein, in order to control the inverter (260), a modulation synchronous with the electrical frequency, in particular a block commutation, is performed when the amount of the determined electrical frequency (f_el) of the electric machine (270) is greater than a second specifiable limit (f_2).

8. An apparatus (200) for controlling an inverter (260), wherein the apparatus comprises a current regulation loop (280) having a voltage modulator (250), the apparatus comprising:
   a first control or regulation loop (210) for determining and specifying the target_switching frequency (f_p_s) in a manner synchronous with the electrical frequency (f_el), said apparatus being configured to control inverter (260) by:
   determining (120) an electrical frequency (f_el) of the electric machine (270);
   determining (130) a target_switching frequency (f_p_s) for a pulse-width modulation, wherein the target_switching frequency (f_p_s) is synchronous with the determined electrical frequency (f_el) of the electric machine;
   specifying (140) a target_start angle (alpha_s) of a first voltage indicator of the pulse-width modulation in relation to the stator-fixed alpha axis, or to one of the basic voltage indicators; and controlling (150) the inverter (260) by means of pulse-width modulation using the determined target_switching frequency (f_p_s) and the specified target_start angle (alpha_s), wherein, in order to control the inverter (260), a modulation synchronous with the electrical frequency, in particular a block commutation, is performed when the amount of the determined electrical frequency (f_el) of the electric machine (270) is greater than a second specifiable limit (f_2).

9. A powertrain (300) having an apparatus (200) according to claim 8.

10. A vehicle (400) having a powertrain (300) according to claim 9.

* * * * *